United States Patent
Kerwin et al.

(10) Patent No.: US 10,295,412 B2
(45) Date of Patent: May 21, 2019

(54) MINIMAL-ENERGY UP/DOWN COUNTING APPARATUS AND METHOD FOR EXTREMELY LOW-POWER APPLICATIONS

(71) Applicant: Aeroflex Colorado Springs Inc., Colorado Springs, CO (US)

(72) Inventors: David B. Kerwin, Colorado Springs, CO (US); Alfio Zanchi, Huntington Beach, CA (US)

(73) Assignee: AEROFLEX COLORADO SPRINGS INC., Colorado Springs, CO (US)

( * ) Notice: Subject to any disclaimer, the term of this patent is extended or adjusted under 35 U.S.C. 154(b) by 191 days.

(21) Appl. No.: 15/298,059

(22) Filed: Oct. 19, 2016

(65) Prior Publication Data
US 2017/0242476 A1    Aug. 24, 2017

Related U.S. Application Data

(60) Provisional application No. 62/296,994, filed on Feb. 18, 2016.

(51) Int. Cl.
*G01K 1/02* (2006.01)
*G01K 7/00* (2006.01)

(52) U.S. Cl.
CPC ............... *G01K 1/02* (2013.01); *G01K 7/00* (2013.01); *G01K 2215/00* (2013.01); *G01K 2219/00* (2013.01); *G06F 2212/7201* (2013.01)

(58) Field of Classification Search
CPC .. G01K 1/02; G01K 2215/00; G01K 2219/00; G01K 7/00; G06F 2212/7201; H03M 1/12; Y02D 10/13; Y02D 10/16
See application file for complete search history.

(56) References Cited

U.S. PATENT DOCUMENTS

| | | | |
|---|---|---|---|
| 2003/0071747 A1* | 4/2003 | Connor | H03M 7/16 341/97 |
| 2003/0137439 A1* | 7/2003 | Kwan | H03M 1/0665 341/143 |
| 2012/0212356 A1* | 8/2012 | Killat | H03M 1/125 341/110 |

* cited by examiner

*Primary Examiner* — Terrell S Johnson
(74) *Attorney, Agent, or Firm* — Hogan Lovells US LLP

(57) ABSTRACT

An integrated circuit counter includes a segmented thermometer coding counter architecture that reaches the thermodynamic energy minimum for a forward/reverse counting operation, requiring only one write or one erase operation per count so that energy consumption can be minimized, and circuit endurance maximized.

24 Claims, 10 Drawing Sheets

MINIMAL-ENERGY UP/DOWN COUNTING APPARATUS AND METHOD FOR EXTREMELY LOW-POWER APPLICATIONS

CROSS REFERENCE TO RELATED APPLICATION

The present application relates to and claims priority of U.S. provisional patent application ("Copending Provisional Application"), Ser. No. 62/296,994, filed on Feb. 18, 2016. The disclosure of the Copending Provisional Application is hereby incorporated by reference in its entirety.

FIELD OF THE INVENTION

The present invention relates to integrated circuit counters, and more specifically to a method of operating the integrated circuit counter so that power consumption is minimized for use in low-power applications.

BACKGROUND OF THE INVENTION

Special industrial applications targeted to remote locations or highly-distributed system architectures ("Smart Dust" sensors, for example) call for the operation of electronic systems that are to be powered by energy harvested from the environment, without the need for a local battery or wired energy source. Since the amount of energy that can be derived from vibrations (or other mechanical motion) of the apparatus, light impinging on it, or electromagnetic field in its vicinity is extremely small, these systems are required to be designed for extreme energy efficiency—in both their analog and digital components.

One such electronic device that is most commonly needed in sensors is a simple event counter. By way of example, water or electrical utility meters rely on physical phenomena capable of translating the flow of the physical entity to be metered into a quantized electrical pulse, which can then be counted to quantify the consumption. Vibration sensors, such as strain gauges, can exploit piezoelectric properties of materials to produce pulses that, once counted, provide information as to the frequency and pattern of the motion under observation. The same principle can be applied to sensors, such as rotational encoders and distributed sensing for haptics solutions.

SUMMARY OF THE INVENTION

In order to conserve as much energy as possible and meet the tight power budgets of such "cycle counting" applications, the present invention discloses a segmented Thermometer Count Architecture (TCA) that reaches the thermodynamic energy minimum for an operation of this kind, requiring only one write or one erase operation per pulse. In fact, since the "bit" (Binary digIT) is the minimum amount of recordable information, a counting scheme that updates one single bit per event is to be considered energetically optimal by definition.

According to the present invention, a method of operating an integrated circuit comprising a plurality of digital registers of various respective lengths is disclosed, the method comprising performing only a single-bit write or single-bit erase operation in a single operational cycle to determine a bi-directional (increase or decrease) thermometer count. The integrated circuit can comprise a non-volatile memory integrated circuit such as a floating-gate non-volatile memory integrated circuit (Flash NVRAM). A first register in the integrated circuit counter is sized such that the endurance requirement on its corresponding memory cells upon a predetermined maximum event count is no greater than a predetermined floating-gate technology reliability limit. The method of operation of the present invention first comprises forward counting by performing successive single-bit write operations in a first register, up to the respective length of the first register. The forward counting method is subsequently continued by performing successive single-bit erase operations, after the single-bit write operations have reached the respective length of the first register. The forward counting method is also continued by performing successive single-bit write operations in a second register upon the single-bit write operations reaching the respective length of the first register. The forward counting method is continued in successive registers until a maximum count limit is reached. The integrated circuit counter of the present invention reaches a count limit when a last register contains all "logic one" values. Each register in the integrated circuit counter of the present invention comprises a highest value end bit and a lowest value end bit. The relative values of the highest value end bit and the lowest value end bit are indicative of a forward or reverse cycle. Identical values of the highest value end bit and lowest value end bit require reading additional registers to determine a forward or reverse cycle. Reverse counting is easily accomplished by sequentially reversing the forward counting write and erase operations.

BRIEF DESCRIPTION OF THE DRAWINGS

FIG. 1 shows a thermometer counter architecture according to the present invention wherein three registers of an integrated circuit are shown for monotonic counts 0-27 of a thermometer code that show forward counting in first and second registers;

FIG. 2 shows a thermometer counter architecture according to the present invention wherein three registers of an integrated circuit are shown for monotonic counts 83-11 of a thermometer code that show forward counting in all three registers;

FIG. 3 shows a thermometer counter architecture according to the present invention wherein three registers of an integrated circuit are shown for bi-directional counts 113-119 followed by 118-104 of a thermometer code that show forward and reverse counting in all three registers;

DETAILED DESCRIPTION

Figure 4:
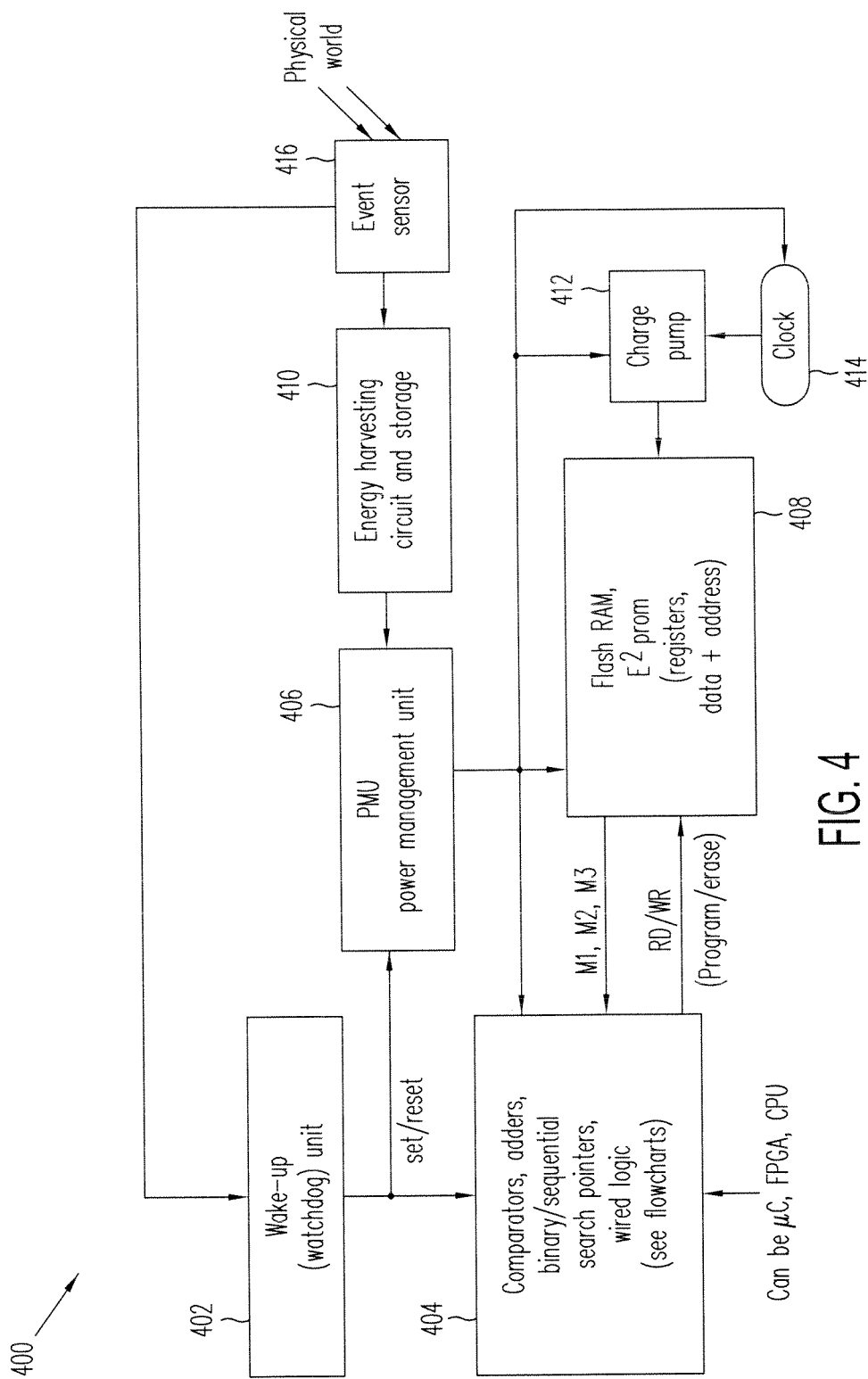
FIG. 4 shows a block diagram of a hardware embodiment of the integrated circuit counter according to the present invention.

The implementation of the architecture in an integrated circuit counter according to the present invention is now described.

Figure 1:
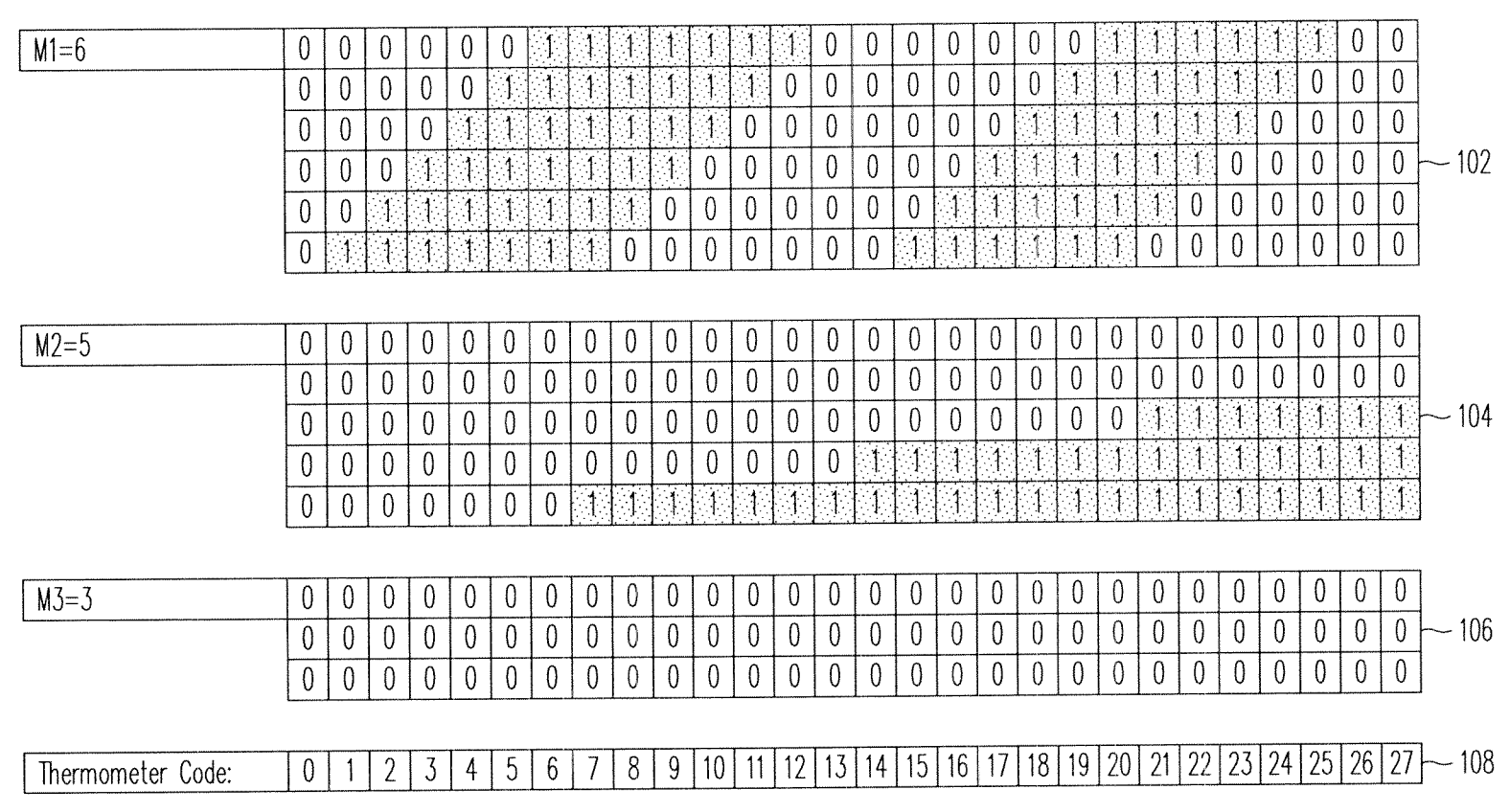

In a practical integrated circuit implementation, the thermometer code according to the present invention requires a plurality of n digital registers of respective lengths M1, M2 . . . Mn. In a harvested-energy operated paradigm, for instance, the registers can be realized as part of a non-volatile memory block. FIG. 1 illustrates how the coding scheme works for a simple case of three registers 102, 104, and 106 where the respective lengths are given as M1=6, M2=5, and M3=3. Note in FIG. 1 that the corresponding thermometer code 108 is also shown, wherein counts 0-27 are shown occurring in time with each count cycle. Per each count cycle, the registers are updated according to the procedure set forth in the present invention and starting from the bottom of registers M1, M2, and M3 in their respective sequence.

Figure 2:
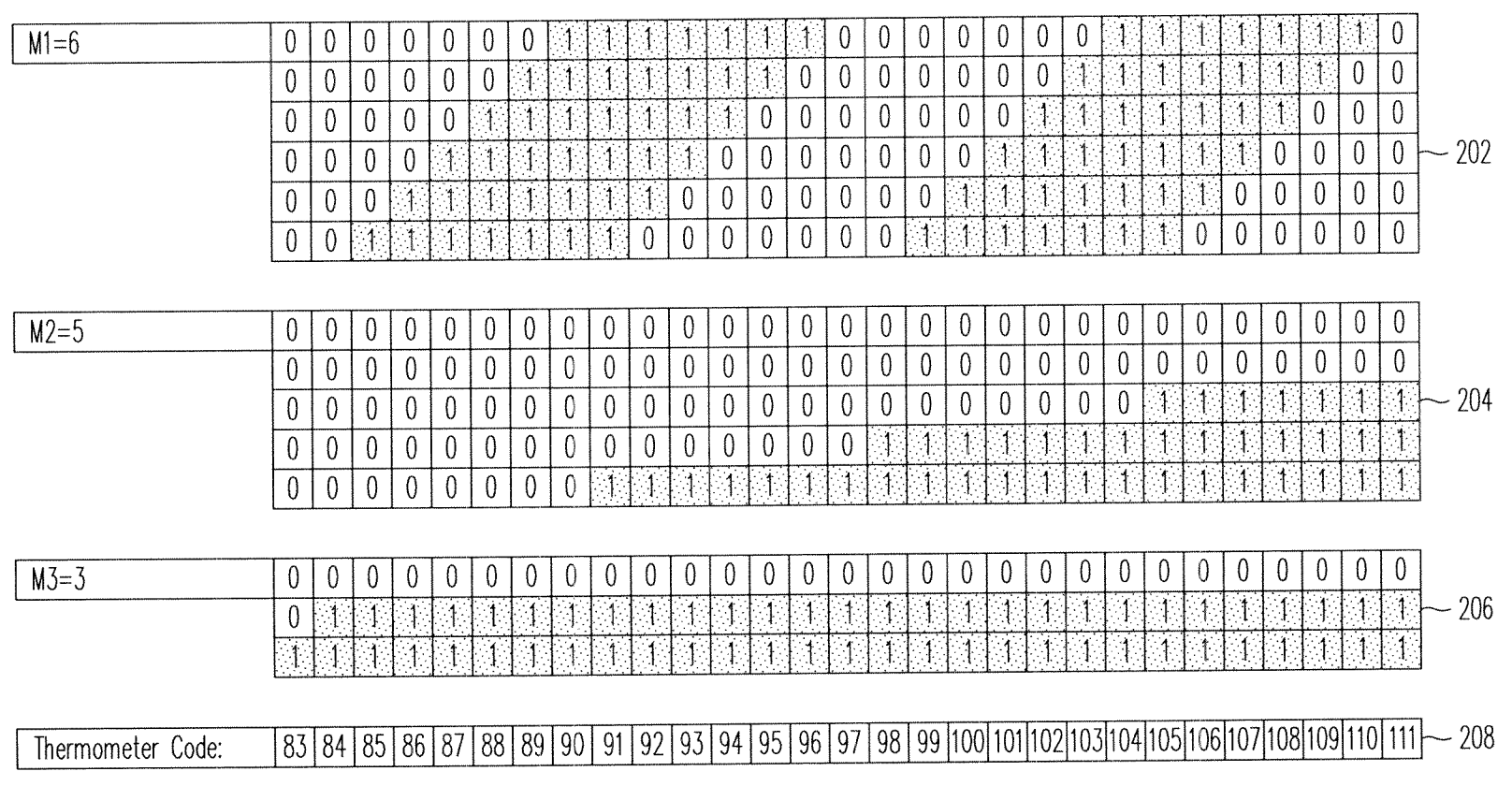

FIG. 2 shows the same three registers and thermometer code as was shown in FIG. 1. These elements, however, are respectively labeled 202, 204, 206, and 208 since they are shown at a later count range of 83-111. FIG. 2 also shows the thermometer code operation of the highest-weighted register 206, which is invoked for higher value counts. As can be seen, a single cycle never requires more than a single write or a single erase operation, thus minimizing the energy required per cycle.

Figure 3:
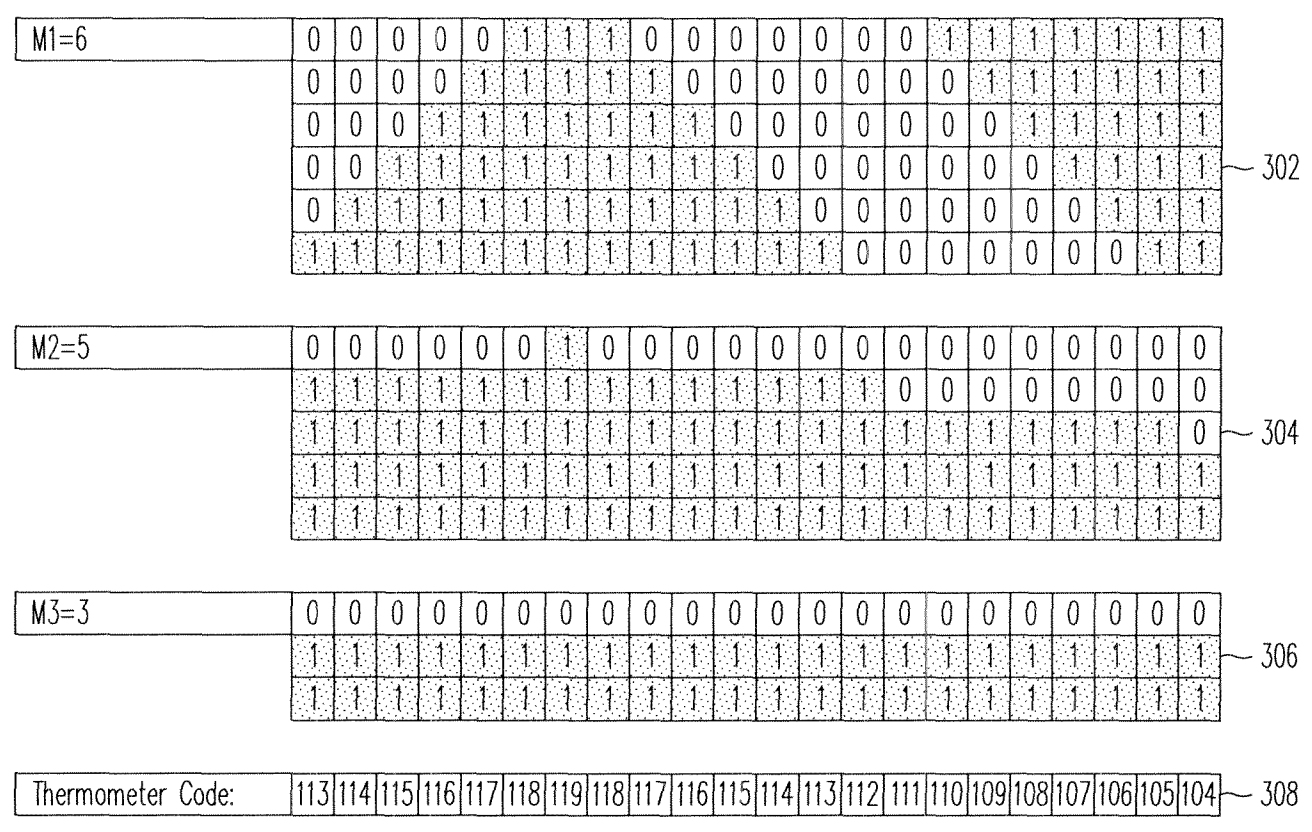

FIG. 3 shows the same three registers shown in FIG. 1 and FIG. 2. These elements however, are respectively labeled 302, 304, 306, and 308 since they are shown at a count increase range of 113-119 followed by a count decrease range of 118-104. As an additional desirable feature of this method, counting backwards upon a reverse count detection from the sensor under monitoring is easily accomplished by sequentially reversing all the operations, as shown in FIG. 3.

It is important to note that, while in principle the same degree of thermodynamic efficiency could be reached by way of a straightforward thermometer count in a linear register, the integrated circuit register arrangement and digital update counting method of the present invention naturally limit the size of the register used, while still allowing for a very high event count. It can be easily shown that the maximum number of cycles $C_{max}$ that can be achieved with the disclosed Thermometer Count Architecture of the present invention is greater than the product of all the n register depths $M_i$ as follows:

$$C_{max} > \Pi_{i=1}^{n} M_i \quad (1)$$

Additional technological constraints may dictate the optimal sizing of the registers in the various applications, such as the register cell's endurance and reliability stress limits in the case of storage of the counts between successive occurrences of the energy-harvesting events in a non-volatile device. Since the "M1" base register receives the highest number of read/write cycles, under these constraints it would need to be sized such that the endurance requirement on its cells be no greater than the particular floating-gate technology reliability limit. FIGS. 1-3 show that, unlike for a binary code where the Least Significant Bit (LSB) is continuously toggled and therefore its reliability stressed the most, the endurance requirement is essentially the same for each bit in the "M1" register according to the teachings of this invention, which equalizes the reliability stress amongst all cells.

As an example, for an IC that must be able to count up to $2^{32}$ (i.e. 4.3 billion events), the following combination will be sufficient to provide actually more than 4.3 billion cycles: M1=$2^{13}$=8,192; M2=$2^{11}$=2,048; and M3=$2^{8}$=256. The additional factor of 2 due to the double revolving of "1's" and "0's" before the next register (M2) is updated, and the sequence on register M1 repeats itself, is already factored in by the counting method as applied to the higher level registers. Even though the sum of the exponents 13+11+8 equals 32—i.e., the register sizing would be theoretically be the minimum necessary—thanks to the higher efficiency provided by the disclosed Thermometer Count Architecture this particular combination provides, in fact, as many as 4,299,687,167 cycles—compared to the requirement of $2^{32}$=4,294,967,296 cycles. The technique therefore delivers a full 4,719,871 extra cycles above the required maximum, due to its additional next-order bit set/reset mechanism, that adds more states as compared to a straight segmented thermometer count. The ASIC will have reached its limit when the last "M3" register contains all "1" values; notice, however, that all the lower-order registers have been completely written and completely erased, and are ready in their native "all 0's" state upon reaching that final condition (as noticed in FIG. 10).

Practical electrical implementation aspects of the counting method and integrated circuit counter architecture of the present invention are now described. While the physical realization of the apparatus is conducive to using registers defined on a non-volatile memory, as addressed and modified by a simple state machine built with custom "glue logic" for maximum energy efficiency, it is important to recognize how alternative implementations such as Field-Programmable Gate Arrays (FPGA's) with internal memory banks can also be viable. As anticipated the invention not only minimizes the energy per count recorded, but also aims at optimizing the endurance characteristics of the memory registers or cells, ensuring the longest possible reliable operating life of electronic circuit embodiments.

One of the advantages of the Thermometer Count Architecture of the present invention is that the thermometer code need not be decoded to determine what is the next required write/erase operation. The revolving nature of each of the registers (especially the lowest-order "M1" base register) only requires knowledge of the two end bits, to resolve which direction is required for a forward or reverse cycle. For example, referring to thermometer code "4" in FIG. 1: by reading the lowest bit value of "1" and the highest bit value of "0" in the "M1" register, the state machine knows that a "1" needs written at the interface between the "1's" and "0's" for the next forward cycle (program operation); or a "0" needs written at that same interface for the next reverse cycle (erase operation). In the case where both end bits in the "M1" register have instead the same value (either both "1's" or both "0's"), the "M2" and "M3" registers must be read to determine the next step in the method—as in the case of thermometer code "7" in FIG. 1. In this latter case, because of the sizes chosen for M2 (5 bits) and M3 (3 bits), since the value of the "M2+M3" registers is odd the next operation is uniquely determined to be:

a. an erase in the "M1" register, for a forward cycle; or
b. an erase in the "M2" register, for a reverse cycle.

From an electrical point of view, having determined the nature (direction) of the next operation, the IC digital engine must now localize the interface between "1's" and "0's" in the register, to locate the next bit that needs to be modified. While this is a pure detail of practical electrical implementation, such a search becomes most critical for the "M1" register if, e.g., tight endurance limitations are imposed on the memory registers by the reliability constraints of its technological implementation. Non-volatile memory circuits such as dual-gate tunneling Flash memory or other Electrically Erasable/Programmable Read-Only Memory (EEPROM) for instance will be subject to such endurance limitations. After having read the two end bits and determined that they are not identical, a binary search is performed. Using the example of thermometer code "4" in FIG. 1: after reading the two end bits (and once determined that a forward count requires to write the next bit in the "upwards" direction, as shown in the figure), one or both of the two middle bits of the register can be read, to resolve that the next search should continue in the "upper" half of the register. This binary search method can then be efficiently iterated. Also, after some pre-determined number of binary search steps narrowing down on the location of the 0-1 interface, the best energy efficiency can be achieved by finishing with a sequential read—to be performed in the pre-determined direction to find the interface location between "0's" and "1's". For example, after four such binary search steps in a 4,096-cell register ($2^{12}$), the maximum distance to the interface will be <256 (or $2^{12}/2^4$): now small enough, for example, for precharged dynamic digital arithmetic ("Manchester" logic chains) to be used effectively.

A block diagram 400 of a hardware embodiment of the integrated circuit of the present invention is shown in FIG. 4. The counting method of the present invention can be realized in FSM 404 (Finite State Machine), which in turn can be implemented via a full μC (microcontroller), FPGA (Field-Programmable Gate Array), PLA (Programmable Logic Array), or even a custom CPU digital logic ASIC (Central Processing Unit coded in RTL/VHDL/Verilog and auto-placed and routed as an Application-Specific Integrated Circuit chip). Additional supporting circuitry can include a wake-up circuit 402, a power management circuit 406, non-volatile memory 408, energy harvesting circuit 410, charge pump 412, clock circuit 414, and event sensor 416 coupled together as shown. The counting method of the present invention can be implemented as 1) micro-programmed logic (maintaining program/data separation and a program counter, or merging program and data as in normal Von Neumann's architectures); but for maximal energy efficiency, 2) a more basic sequencer with a time counter generating a sequential series of decoded signals to operate the various comparators, adders and Program/Erase memory drive lines, which can be synthesized following a number of coding styles from RTL, to Verilog.

The Thermometer-to-Binary decoding according to the present invention is now described.

For practical purposes a decoding method of the Thermometer Count Architecture code format into the more customary binary representation is now described. Supposing the locations of the "0's" to "1's" interfaces within the three thermometer registers in the example (M1, M2, and M3) are i, j, and k respectively, it can be shown that the integer count, D, for the total number of cycles recorded is given by the following equations:

$$D = k \cdot (M1+1) \cdot (M2+1) + (k \% 2) \cdot B + [(k+1)\%2] \cdot A \quad (2a)$$

$$B = (M1+1) \cdot (M2+1) - 1 - A \quad (2b)$$

$$A = j + (j \cdot M1) + (M1-i) \cdot (j \% 2) + (i \cdot [(j+1) \% 2]) \quad (2c)$$

where the symbol "%" represents the remainder of a modulus (integer ratio) operation. Essentially j % 2 returns 0 for even j and 1 for odd j, which is implemented in practice via a simple one-bit counter or a single flip-flop as an input frequency divider. Note that the values (M1+1), (M2+1), and their product (M1+1)·(M2+1) are design parameters that can be hard-coded into the decoder; and a convenient choice of the registers' size enables the binary multiplications to be converted into efficient bit-shifts (e.g., M1=7 and M2=3 would turn (M1+1)·(M2+1) into a simple 5-bit left shift). Also, the factors multiplied by the remainder of the modulus-2 operation can take on only two possible values: the original value, or zero. A true integer multiplication is therefore not required; all that is required in this case is a comparison of the LSB of the respective binary counter to the one-bit counter implementing the "% 2" function. In conclusion there are only two true integer multiplications required in the decoding: k·C, where C=(M1+1)·(M2+1); and j·M1.

Error Detection and Correction and "Bubbles" are now described.

By its very nature, a thermometer code contains some redundancy. The only real information is contained in the location of the interface between "1's" and "0's". Yet, except for the cases where the thermometer code is close to the upper or lower register boundary, there are multiple programmed hits that concur in defining the location of the boundary. Therefore, one may be able to tolerate mis-reads or flipped bits, provided those errors (typically referred to as "bubbles" in digital jargon) do not interfere with the effective location of the interface. As stated, the last phase of finding the bit code "0-1" interface may involve sequential reads of the register cells, in order to make the search more robust. In the example used above (thermometer code "4" in FIG. 1), if the reading starts in the portion of the register containing all "1's" and stops upon reading the first an error might occur if this first "0" happens to he a "bubble" occurrence. A more robust procedure would, however, read two bits beyond the interface. In this way, the probability of incorrectly determining the interface coincides with the probability of having two consecutive bubble errors, which is the joint probability of two rare events, hence presumably extremely small. If a bubble is detected, independent of its nature ("0" or "1"), it can be flagged and scheduled for correction at the end of all other normal operations, depending on the energy supply regimen requested of the IC. If the bubble is sufficiently "deep" inside the thermometer code (i.e. away from the "0-1" interface), there will be multiple chances for it to be re-written or re-erased; if it happens at the interface though, it may cause an error in the count. Indeed, notice that the counting method of the present invention will inherently attempt to correct the bubble for all consecutive instances of the count, until the cell has been successfully over-written.

Standard bubble-correction circuits utilizing banks of NAND gates with conveniently inverted inputs can be usefully designed in a dedicated ASIC for maximal energy efficiency, or also instantiated into a flexible FPGA configuration.

As a variant of the normal counting method as it has been outlined above, should the bit not be successfully read after being re-written, it may be replaced by diverting the address for that bit to a limited number of "spare bits". This technique would be in line to what is currently common practice for EEPROM and Flash memory architectures (i.e. "paging").

The energy budget of a basic, full-custom CMOS integrated circuit implementation of the present invention is finally described.

An estimate of the energy required to operate the Thermometric Count Architecture counting method of the present invention in a commercial 0.35 μm CMOS ASIC, clocked with a 5 MHz square wave, with registers sized as previously described for a 4-billion count total, is outlined in the following table:

TABLE I

| IC operation | Energy | Unit | Comments |
| --- | --- | --- | --- |
| Longest Seek Operation | 1.0 | nJ | 520 reads @ 5 MHz |
| Erase (max. energy) | 135.0 | nJ | Requires 0.5 ms @ 5 MHz |

TABLE I-continued

| IC operation | Energy | Unit | Comments |
| --- | --- | --- | --- |
| Margin Read | 0.1 | nJ | Actually <0.1 nJ |
| Shut Down Tasks | 0.1 | nJ | Digital logic RESET |
| TOTAL | 136.2 | nJ | |

The energy values as reported refer to a fully custom design of the digital logic. More flexible digital implementations of the TCA method such as FPGAs or PLAs forcibly would not be as energy efficient, due to node multiplexing options inherent to these architectures and therefore to the corresponding increase of the parasitics affecting the same nodes.

Figure 5:
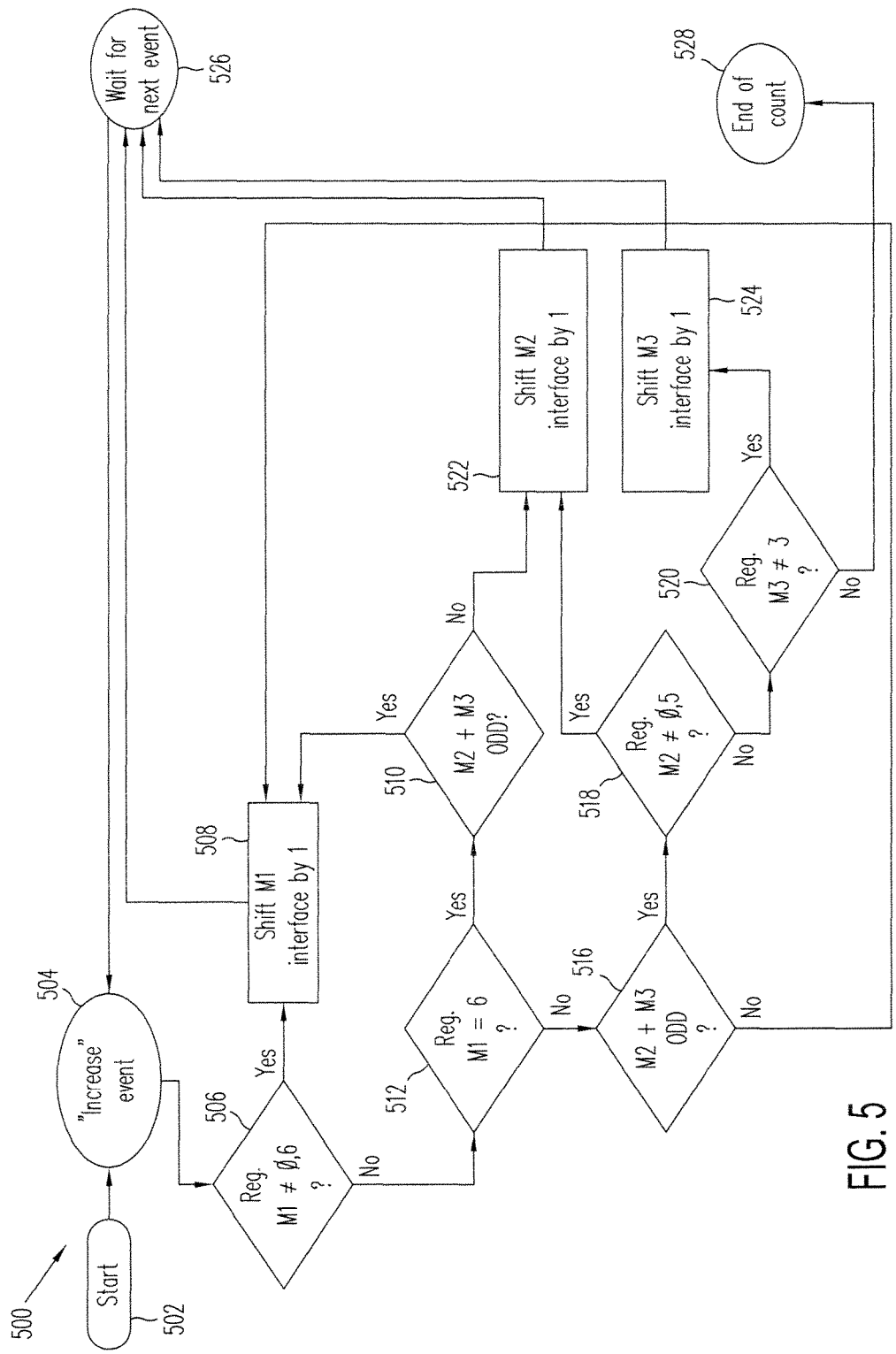
FIG. 5 shows a flow chart of a counting method associated with the integrated circuit counter according to the present invention.
Figure 6:
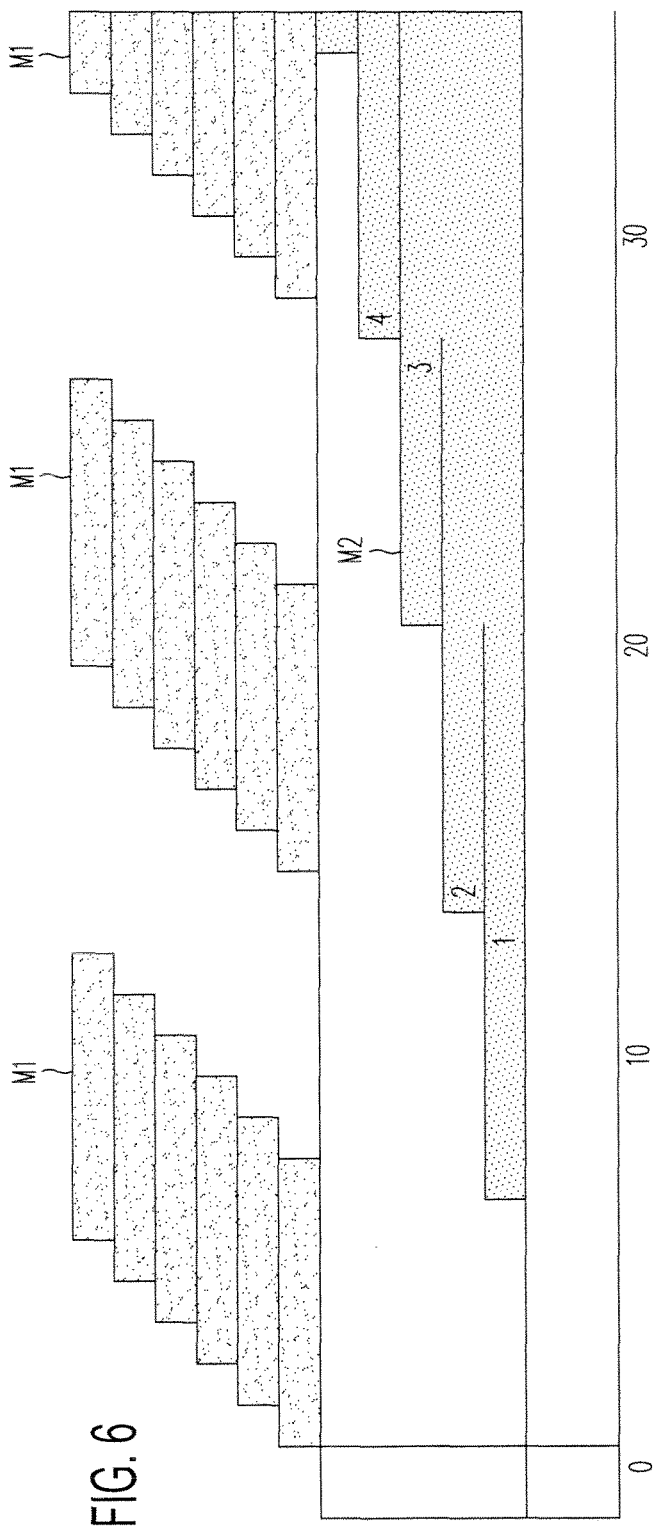
FIGS. 6-10 show a count progression from a zero value count to a maximum value count associated with the integrated circuit counter according the present invention.
Figure 7:
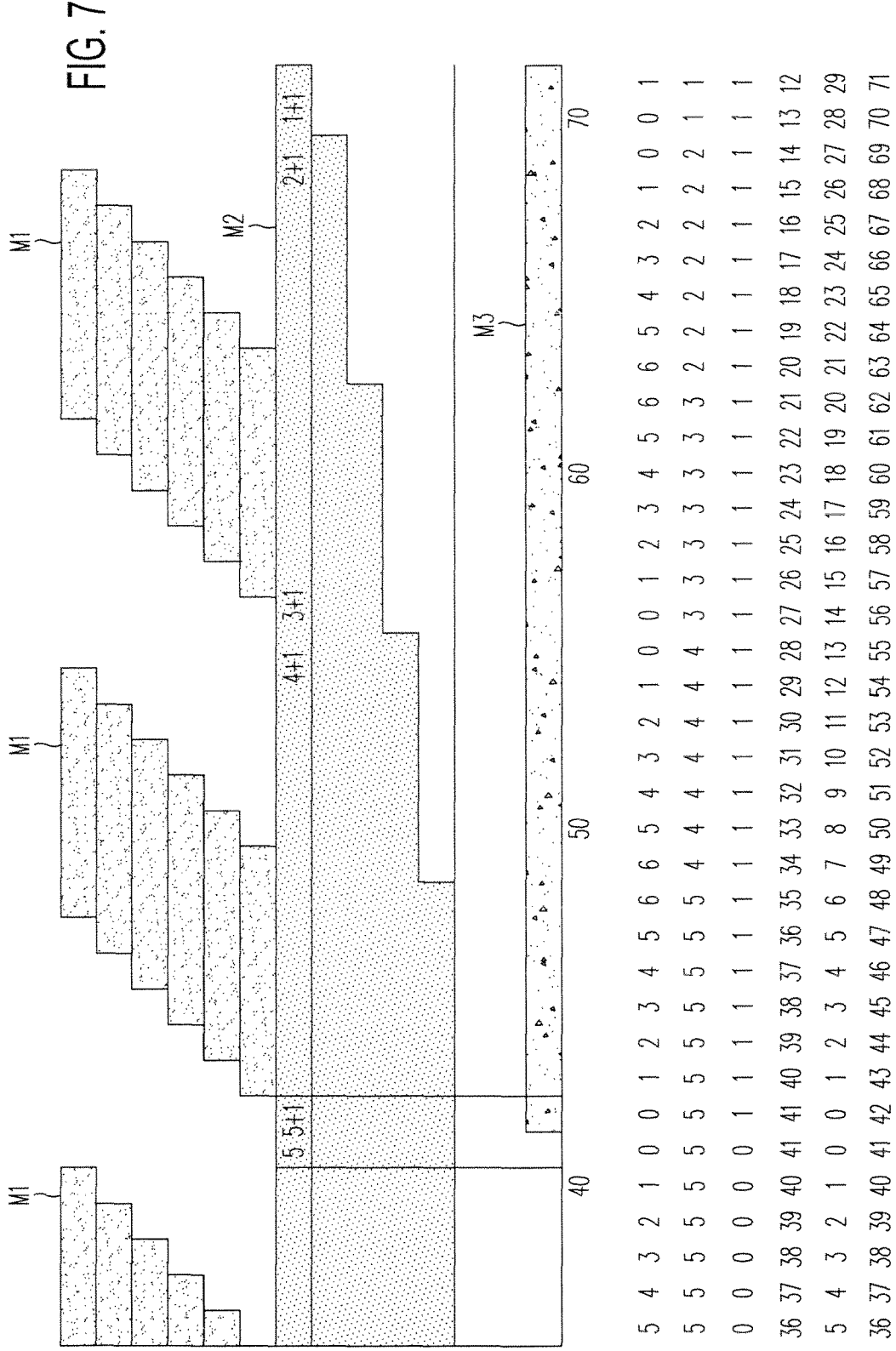

Referring now to FIG. 5, a flow chart 500 shows the operation of the various components associated with the integrated circuit counter of the present invention in case of an "increase" event count. The M1, M2, and M3 register designations previously defined are used in flow chart 500. The counting method starts at step 502. An "increase" data event occurs at step 504. At decision point 506, the integrated circuit counter of the present invention determines whether M1 is not equal to (0,6), which means checking whether the top value and bottom value of the M1 register are not equal. If yes, the counting method proceeds to step 508, which shifts the M1 interface by one. If no, the counting method proceeds to decision point 512, which determines whether the value of register M1 is equal to 6. If yes, the counting method proceeds to decision point 510. If no, the counting method proceeds to decision point 516. Decision point 510 determines whether the sum of M2 and M3 is odd. Decision point 516 also determines whether the sum of M2 and M3 is odd (or whether the top and bottom values of the sum are equal to zero). Regarding decision point 510, if yes, the counting method proceeds back to step 508. If no, the counting method proceeds to step 522. Regarding decision point 516, if yes, the counting method proceeds to decision point 518. Method step 522 shifts the interface of register M2 by one. Decision point 518 determines whether the value of register M2 is not equal to (0,5). If not, the counting method proceeds to decision point 520. If yes, the counting method again proceeds to step 522. Decision point 520 determines whether the value of register M3 is not equal to 3. If not, then all registers have been filled and the counting method terminates at step 528. If yes, the counting method proceeds to step 524. Step 524 shifts the interface of register M3 by one. Regarding steps 508, 522 and 524, the counting method proceeds to "wait for next event" step 526. Once a next data event (increase or decrease) occurs, the counting method proceeds back to step 504. While a representative flow chart 500 is shown in FIG. 5 for operating the integrated circuit counter according to the present invention in an "increase" event, it is known to those skilled in the art that other logical equivalents and even other possible flow charts could be constructed, for both "increase" and "decrease" events.

Figure 8:
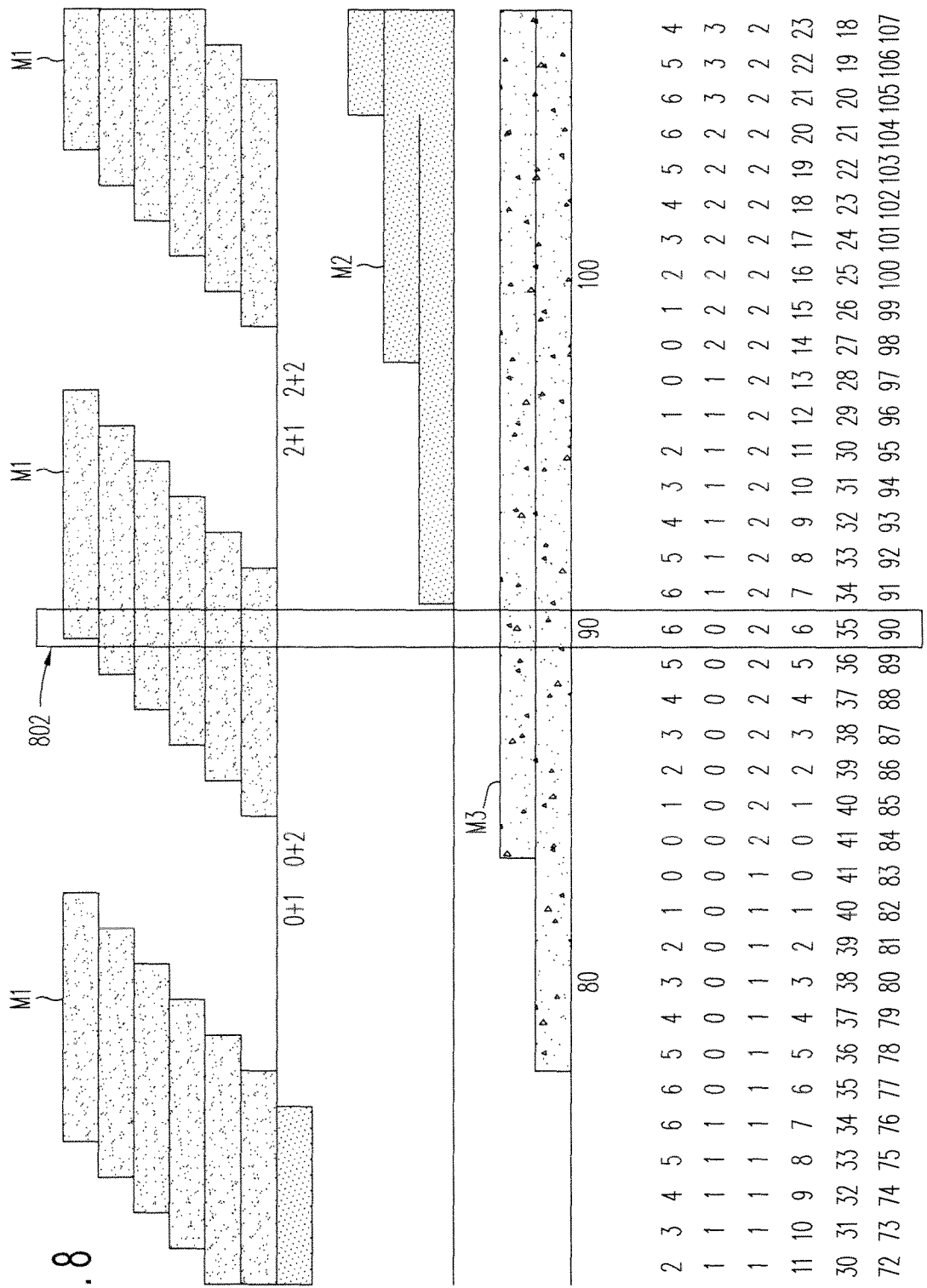
Figure 9:
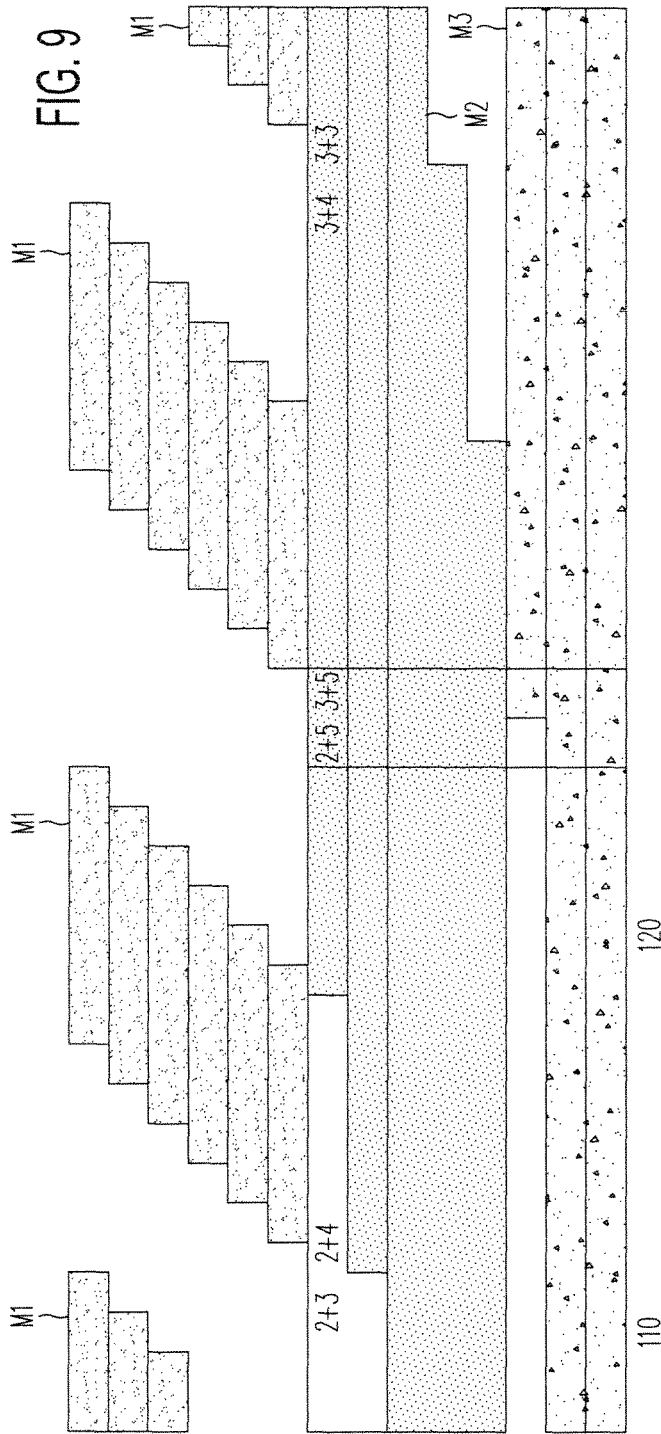
Figure 10:
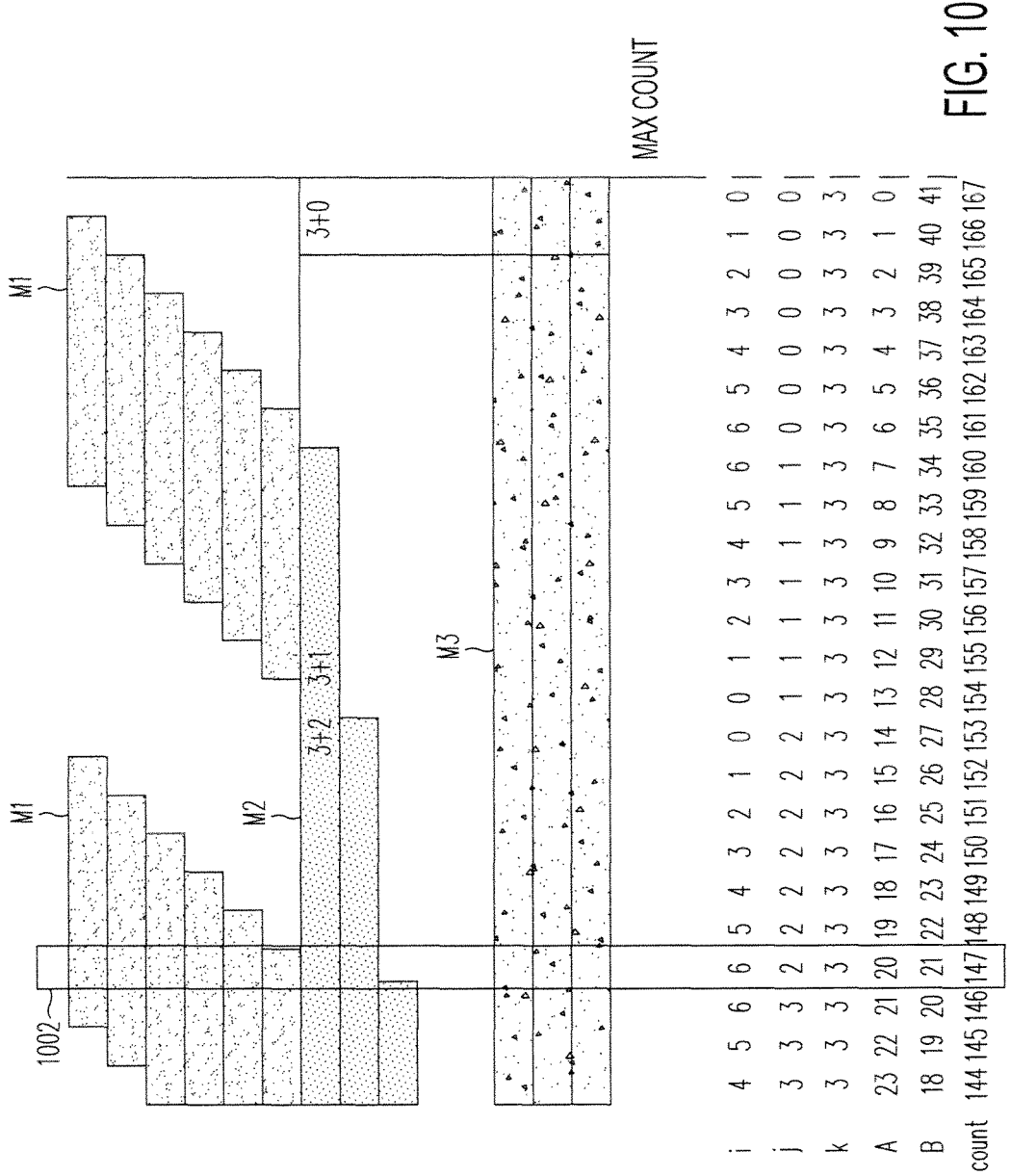

The counting method according to the present invention is fully illustrated from a minimum count to a maximum count through "increase" events in FIGS. 6-10. FIGS. 6-10 reconstruct the successive states assumed bv the three registers (M1, M2, and M3) during a monotonically increasing event count, detailing all the mathematical terms as previously outlined in Equation (2) and showing the revolving population of "1" and "0" instantiated into registers M1, M2 and M3 in a hierarchical fashion, as controlled by the procedure previously described with respect to FIG. 5. In FIGS. 6-10, as previously described, "i" is the value of M1, "j" is the value of M2, "k" is the value of M3—a "1" count in the registers themselves; and "A" and and "count" were all previously described. Various significant count transitions with respect to "i", "j", and "k" are also illustrated in FIGS. 6-10. It is important to note when inspecting FIGS. 6-10 that all of the numbers and graphical items are to be read vertically. For example, a representative count 802 is shown in FIG. 8. In FIG. 8 it will be understood by those skilled in the art that i=6, j=0, k=2, A=6, B=35, and count=90. As another example, a representative count 1002 is shown in FIG. 10. In FIG. 10 it will be understood that i=6, j=2, k=3, A=20, B=21, and count=147.

Although specific embodiments have been illustrated and described herein, it will be appreciated by those of ordinary skill in the art that a variety of alternate and/or equivalent hardware, firmware, and software implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

We claim:

1. A method of operating an integrated circuit comprising a plurality of digital registers of respective lengths, the method comprising performing only a single-bit write or single-bit erase operation on one digital register of the plurality of digital registers in a single operational cycle, wherein a value represented by the plurality of digital registers at the end of an operational cycle comprises a thermometer coded count.

2. The method of claim 1 wherein the integrated circuit comprises a non-volatile memory integrated circuit.

3. The method of claim 1 wherein the integrated circuit comprises a floating-gate non-volatile memory integrated circuit.

4. The method of claim 3 wherein a first register is sized such that the endurance requirement on corresponding memory cells is no greater than a predetermined floating-gate technology reliable limit.

5. The method of claim 1 further comprising forward counting by performing successive single-bit write operations in a first register up to the respective length of the first register.

6. The method of claim 5 further comprising forward counting by performing successive single-bit erase operations after the single-bit write operations have reached the respective length of the first register.

7. The method of claim 5 further comprising forward counting by performing successive single-bit write operations in a second register after the single-bit write operations have reached the respective length of the first register.

8. The method of claim 1 wherein the integrated circuit reaches a count limit when a last register contains all logic one values.

9. The method of claim 1 wherein each register comprises a highest value end bit and a lowest value end bit.

10. The method of claim 9 in which relative values of the highest value end bit and the lowest value end bit determine a single-bit write or erase operation to represent a forward or reverse cycle.

11. The method of claim 9 in which identical values of the highest value end bit and the lowest value end bit require reading additional registers to determine whether a single-bit write or erase operation represents a forward or reverse cycle.

12. The method of claim 6 further comprising reverse counting by sequentially reversing the forward counting write and erase operations.

13. An integrated circuit counter comprising a plurality of digital registers of respective lengths, the integrated circuit counter configured for performing only a single-bit write or single-bit erase operation on one of the plurality of digital registers in a single operational cycle, wherein a value represented by the plurality of digital registers comprises a thermometer coded count.

14. The integrated circuit counter of claim 13 further comprising a non-volatile memory.

15. The integrated circuit of claim 14 wherein the non-volatile memory comprises a floating-gate non-volatile memory integrated circuit.

16. The integrated circuit of claim 15 wherein a first register is sized such that the endurance requirement on corresponding memory cells is no greater than a predetermined floating-gate technology reliable limit.

17. The integrated circuit of claim 13 further configured for forward counting by performing successive single-bit write operations in a first register up to the respective length of the first register.

18. The integrated circuit of claim 17 further configured for forward counting by performing successive single-bit erase operations after the single-bit write operations have reached the respective length of the first register.

19. The integrated circuit of claim 17 further configured for forward counting by performing successive single-bit write operations in a second register after the single-bit write operations have reached the respective length of the first register.

20. The integrated circuit of claim 13 configured for reaching a count limit when a last register contains all logic one values.

21. The integrated circuit of claim 13 wherein each register comprises a highest value end bit and a lowest value end bit.

22. The integrated circuit of claim 21 wherein relative values of the highest value end bit and the lowest value end bit determine a single-bit write or erase operation to represent a forward or reverse cycle.

23. The integrated circuit of claim 21 wherein identical values of the highest value end bit and the lowest value end bit require reading additional registers to determine whether a single-bit write or erase operation represents a forward or reverse cycle.

24. The integrated circuit of claim 18 further configured for reverse counting by sequentially reversing the forward counting write and erase operations.

* * * * *